United States Patent
Lee et al.

(10) Patent No.: US 8,111,292 B2
(45) Date of Patent: Feb. 7, 2012

(54) METHOD AND APPARATUS FOR STABLY CORRECTING HANDSHAKE IN CAMERA PANNING SITUATION

(75) Inventors: Chang-woo Lee, Suwon-si (KR); Byung-sun Choi, Gunpo-si (KR); Yoon-cheol Shin, Seoul (KR); Tae-wook Nam, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 603 days.

(21) Appl. No.: 12/061,110

(22) Filed: Apr. 2, 2008

(65) Prior Publication Data

US 2009/0091631 A1    Apr. 9, 2009

(30) Foreign Application Priority Data

Oct. 5, 2007 (KR) .................. 10-2007-0100346

(51) Int. Cl.
*H04N 5/228* (2006.01)
*G03B 17/00* (2006.01)

(52) U.S. Cl. .................. 348/208.4; 348/208.99; 396/52; 396/55

(58) Field of Classification Search ............... 348/208.4, 348/208.99; 396/52–55
See application file for complete search history.

(56) References Cited

U.S. PATENT DOCUMENTS 6,940,542 B2 * 9/2005 Kitazawa et al. ........ 348/208.99
2006/0044403 A1 * 3/2006 Hatanaka et al. .......... 348/208.4

* cited by examiner

*Primary Examiner* — Lin Ye
*Assistant Examiner* — Mekonnen Dagnew
(74) *Attorney, Agent, or Firm* — Sughrue Mion, PLLC

(57) ABSTRACT

Provided are an apparatus and method for stably correcting handshake that occurs during a camera panning situation. In the method, movement information is accumulated by a predetermined unit for a predetermined period of time. A regression model is matched to the accumulated movement information so as to determine a situation as one of a panning mode and a handshake mode. Switching is performed between the handshake mode and the panning mode according to the size of a matching factor generated by the matched regression model. Handshake is corrected on the basis of a handshake correcting amount determined according to one of the handshake mode and the panning mode.

17 Claims, 5 Drawing Sheets

METHOD AND APPARATUS FOR STABLY CORRECTING HANDSHAKE IN CAMERA PANNING SITUATION

CROSS-REFERENCE TO RELATED PATENT APPLICATION

This application claims priority from Korean Patent Application No. 10-2007-0100346, filed on Oct. 5, 2007, in the Korean Intellectual Property Office, the disclosure of which is incorporated herein in its entirety by reference.

BACKGROUND OF THE INVENTION

1. Field of the Invention

The present invention relates to an image capturing apparatus such as a camera or camcorder, and more particularly, to a method and apparatus for stably correcting handshake that occurs during a camera panning situation.

2. Description of the Related Art

While image capturing is performed using an image capturing apparatus such as a camera or camcorder, the image capturing is mostly performed by a user holding the image capturing apparatus in his/her hands, without using a tripod. At this point, shaking is generated in the shooting apparatus due to movement of the hands holding the image capturing apparatus. Also, the shaking of the image capturing apparatus causes shaking of an image being captured. Therefore, it is necessary for the image capturing apparatus to automatically detect and correct handshake.

The handshake is unintentionally generated while image capturing is being performed by using an image capturing apparatus. Meanwhile, panning is an operation in which a user intentionally changes a shooting direction of the image capturing apparatus. Panning means horizontally moving the shooting direction of the image capturing apparatus so as to move an image displayed on a screen in a lateral direction.

FIG. 1A is a graph explaining a conventional method of correcting movement caused by handshake.

A y-axis represents an accumulated value of movement vectors in relation to a time axis, and an x-axis represents time. Reference numeral 130 refers to an accumulated value of movement vectors, reference numeral 110 refers to a handshake section, and reference numeral 120 refers to a panning section.

Referring to FIG. 1A, it appears that the accumulated value of the movement vectors, which are due to the random handshake of a user, is represented as a waveform at a constant level. However, when the user's intentional movement, that is, a situation such as panning occurs, the accumulated value of the movement vectors increases consistently. Therefore, when the accumulated value increases beyond a predetermined level, or movement in the same direction is continuously detected at a predetermined level, it is judged as panning.

However, the conventional method of judging panning or tilting when movement vector values successively appear in the same direction a predetermined number of times has a limitation for the case illustrated in FIG. 1B.

FIG. 1B illustrates an accumulated value of movement vectors for the case where an abnormal situation occurs during a panning mode. Reference numeral 122 refers to a section where the abnormal situation occurs during a panning operation.

Referring to FIG. 1B, an image capturing apparatus does not detect a panning situation when a user's handshake occurs during a panning operation and movement is made in a direction opposite to that of the panning operation, so that it is difficult to correct the handshake.

SUMMARY OF THE INVENTION

The present invention provides a stable handshake correcting method to be used during a camera panning situation by matching a regression line model or a regression curve model with accumulated movement information in an image capturing apparatus such as a camera or camcorder.

According to an aspect of the present invention, there is provided a handshake correcting method including: accumulating movement information in predetermined units for a predetermined period of time; matching a regression model to the accumulated movement information to determine a situation as one of a panning mode and a handshake mode; performing switching between the handshake mode and the panning mode according to a matching factor generated by the matched regression model; and correcting handshake on the basis of a handshake correcting amount determined according to one of the handshake mode and the panning mode.

The performing of switching between the handshake mode and the panning mode may include: changing the panning mode to the handshake mode when a slope value predicted by the regression model is smaller than a threshold value, or correlation between an accumulated movement vector value and a coefficient of a regression line or curve is smaller than the threshold value during the panning mode; and initializing the accumulated movement vector value to control a current corrected amount.

The performing of switching between the handshake mode and the panning mode may include: changing the handshake mode to the panning mode when a slope value predicted by the regression model is greater than a threshold value during the handshake mode; and initializing the accumulated movement vector value to control a current corrected amount.

According to another aspect of the present invention, there is provided a handshake correcting apparatus including: a movement predicting unit estimating movement information in predetermined units; a handshake correcting information generating unit accumulating the movement information estimated by the movement predicting unit for a predetermined period of time to match a regression model to the accumulated movement information, and extracting movement correcting information for controlling a movement correcting amount depending on whether an inflection point is detected according to coefficient information of the regression model; and a movement correcting unit correcting handshake on the basis of a handshake correcting amount extracted from the handshake correcting information generating unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1A:
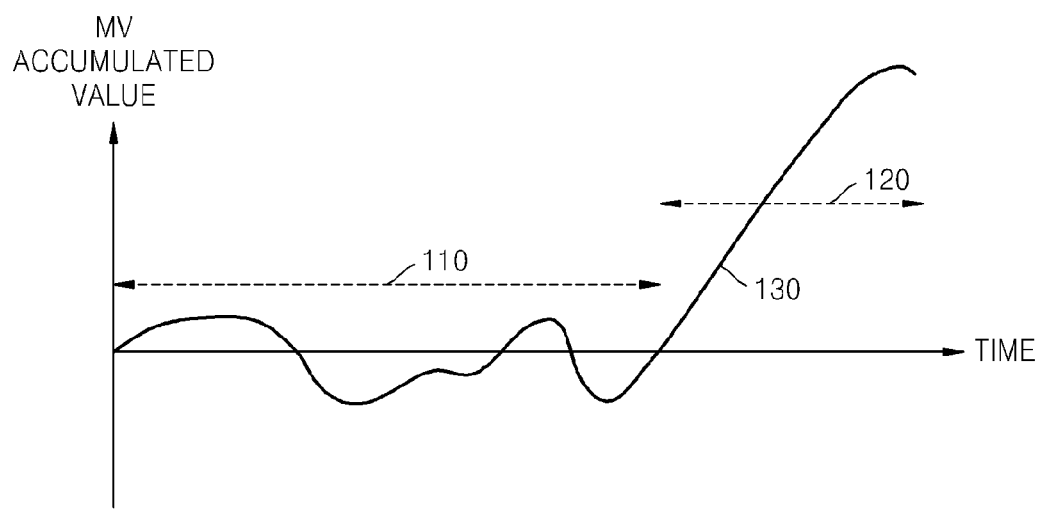
FIGS. 1A and 1B are graphs explaining a conventional method of correcting movement caused by handshake.
Figure 1B:
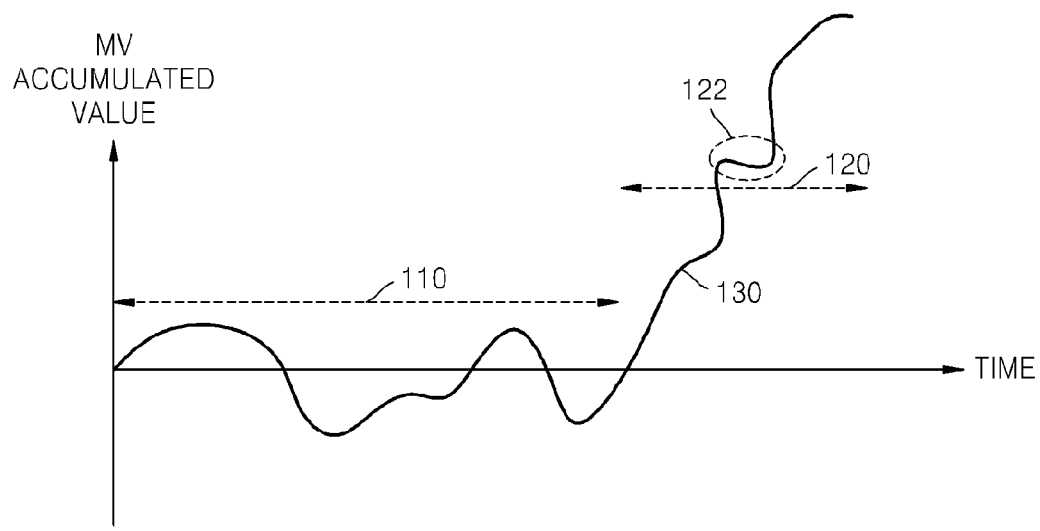
Figure 2:
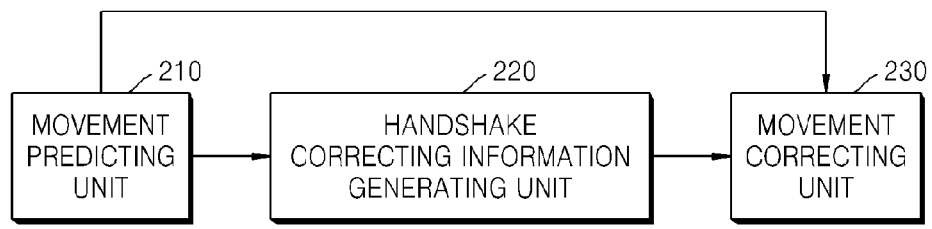
FIG. 2 is a block diagram of a handshake correcting apparatus according to an exemplary embodiment of the present invention.

FIG. 2 is a block diagram of a handshake correcting apparatus according to an embodiment of the present invention.

The handshake correcting apparatus illustrated in FIG. 2 includes a movement predicting unit 210, a handshake correcting information generating unit 220, and a movement correcting unit 230.

The movement predicting unit 210 divides a captured image signal into blocks or regions of predetermined units, and estimates movement vectors for the divided blocks, respectively, using a block matching algorithm. For example, the movement predicting unit 210 calculates a difference between a block of a reference frame (or a previous frame) and a block of a current frame by using time correlation between adjacent frames to estimate a movement vector for each block. Also, the movement predicting unit 210 explores global movement vectors of an image so as to correct an image where handshake has occurred, in a time direction.

The handshake correcting information generating unit 220 accumulates global movement vectors explored by the movement predicting unit 210 for a predetermined period of time, and matches a regression model with the accumulated global movement vectors in order to determine whether a situation is performed in a panning mode or a handshake mode. Also, the handshake correcting information generating unit 220 switches between the handshake mode and the panning mode with reference to correlation between a coefficient of the matched regression line or curve and the accumulated global movement vectors, and generates movement correcting information corresponding to the switched handshake mode or the panning mode. At this point, the movement correcting information includes a handshake correcting amount and a movement correcting command.

The movement correcting unit 230 performs handshake correction using the global movement vectors of the movement predicting unit 210 according to the movement correcting information generated by the handshake correcting information generating unit 220.

Figure 3:
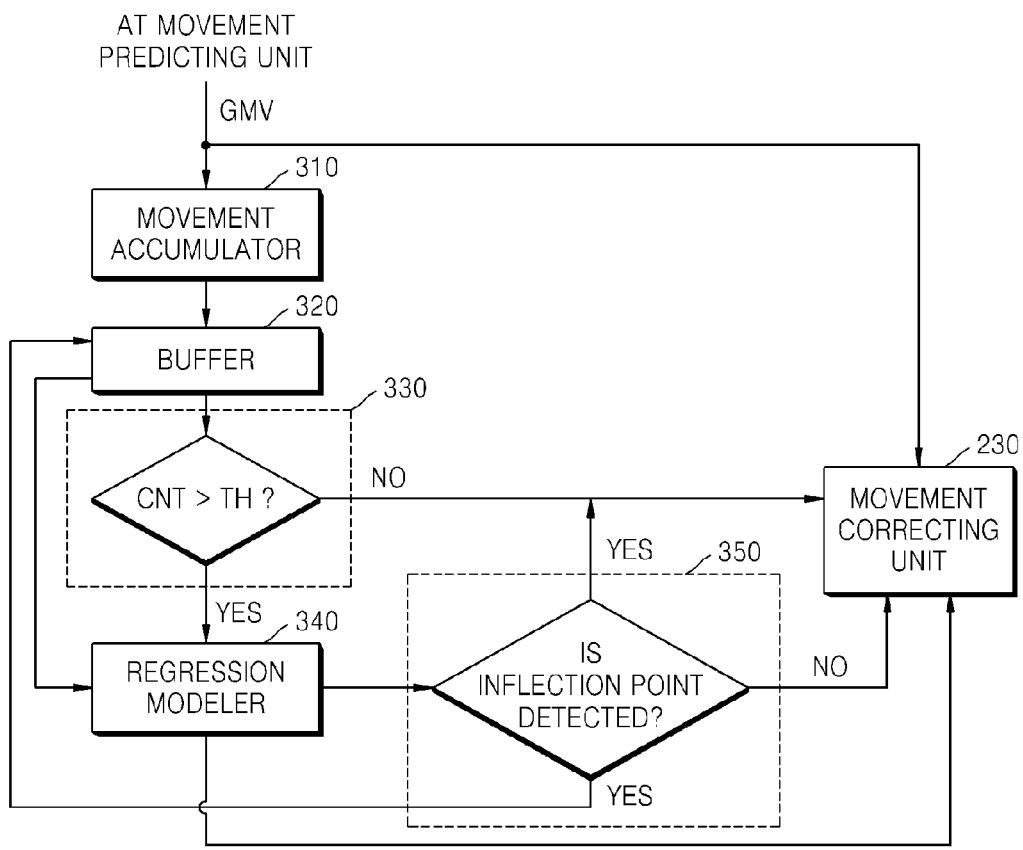
FIG. 3 is a detailed view of a handshake correcting information generating unit illustrated in FIG. 2.

FIG. 3 is a detailed view of the handshake correcting information generating unit 220 illustrated in FIG. 2.

A movement accumulator 310 accumulates movement information successively provided in time for a predetermined period of time to accurately discriminate between a panning situation and a handshake situation. Here, the movement information means a global movement vector of a current frame extracted by a movement estimating block or sensor. Although the movement accumulator 310 may need to accumulate global movement vectors for a long time to accurately predict handshake, the movement accumulator 310 may accumulate the global movement vectors for a short time so as to prevent a delay.

A buffer 320 constantly stores the accumulated global movement vectors accumulated by the movement accumulator 310.

Figure 4:
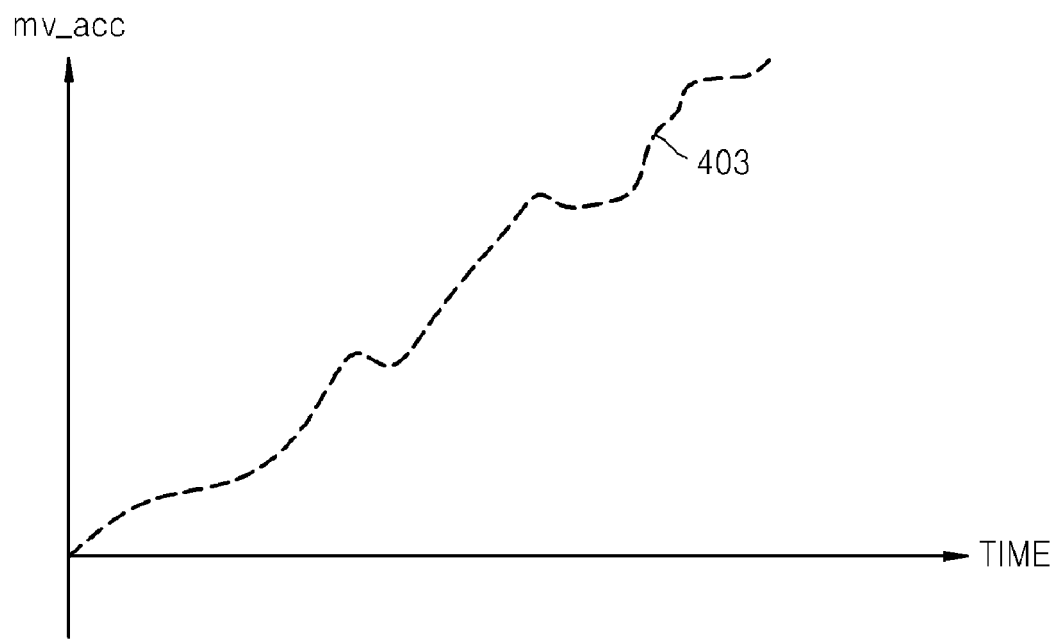
FIG. 4 is a graph illustrating an accumulated entire range movement vector.

At this point, the global movement vectors stored in the buffer 320 can be represented by a graph as illustrated in FIG. 4. In FIG. 4, a y-axis represents an accumulated size for global movement vectors in relation to a time axis, an x-axis represents time, and reference numeral 403 refers to an actually accumulated global movement vector value. Referring to FIG. 4, an accumulation amount increases in a positive direction over time.

A counter 330 counts global movement vectors accumulated in the buffer 320.

A regression modeler 340 matches a regression line or curve model to the global movement vectors stored in the buffer 320 when the number of accumulated global movement vectors is greater than a threshold value, and delivers a movement correcting command that uses a global movement vector not corrected by the movement correcting unit 230 when the number of accumulated global movement vectors is smaller than the threshold value. Also, the regression modeler 340 determines a panning degree by using a coefficient of the order of the matched regression line or curve.

Therefore, a matched regression equation representing an accumulated data pattern in the form of a first order regression line model can be given by Equation 1. In another embodiment of the present invention, the accumulated data pattern can be represented in the form of a regression line model of a high order function.

$$Y = \beta_0 + \beta_1 x + \varepsilon 0 \qquad \text{Equation 1}$$
$$\beta_1 = \frac{\sum (X_i - \overline{X})(Y_i - \overline{Y})}{\sum (X_i - \overline{X})^2},$$

where Y is an observed value of an actually accumulated movement vector, $\beta_0$ is an intercept, $\beta_1$ is a slope of a matched first order regression line, x is a position in time, and $\varepsilon_0$ is a residual between a matched first order regression line and an actually observed movement vector. Also, $X_i$ and $Y_i$ are an x coordinate and a y coordinate of a straight line in a 2 dimensional (2D) coordinate system, respectively, and $\overline{X}, \overline{Y}$ are average values of data on an x-axis and a y-axis, respectively.

Figure 5:
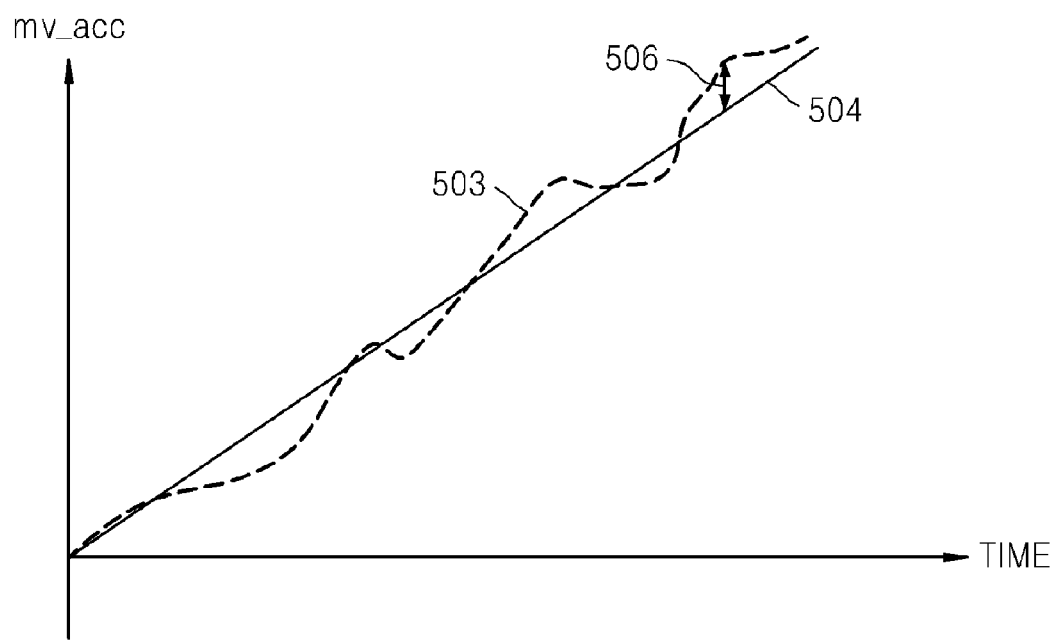
FIG. 5 is a graph illustrating a regression line matched with accumulated movement information.

The matched regression line is shown in the graph illustrated in FIG. 5. Referring to FIG. 5, reference numeral 504 refers to a matched regression line. The regression line is an intentional panning component of a user in a camera movement. Reference numeral 506 refers to handshake information of the user, which is generated externally.

Therefore, the global movement vectors accumulated in the buffer 320 are matched with a regression line or curve by using the regression line model. However, referring to FIG. 6, in the case where a user's panning stops and a stop situation (section denoted by reference numeral 606) occurs, a regression model matched with accumulated movement vectors is expressed by a straight line 604. Evidently, the slope of the regression line 604 illustrated in FIG. 6 is smaller than the slope of the regression line 504 illustrated in FIG. 5.

Figure 6:
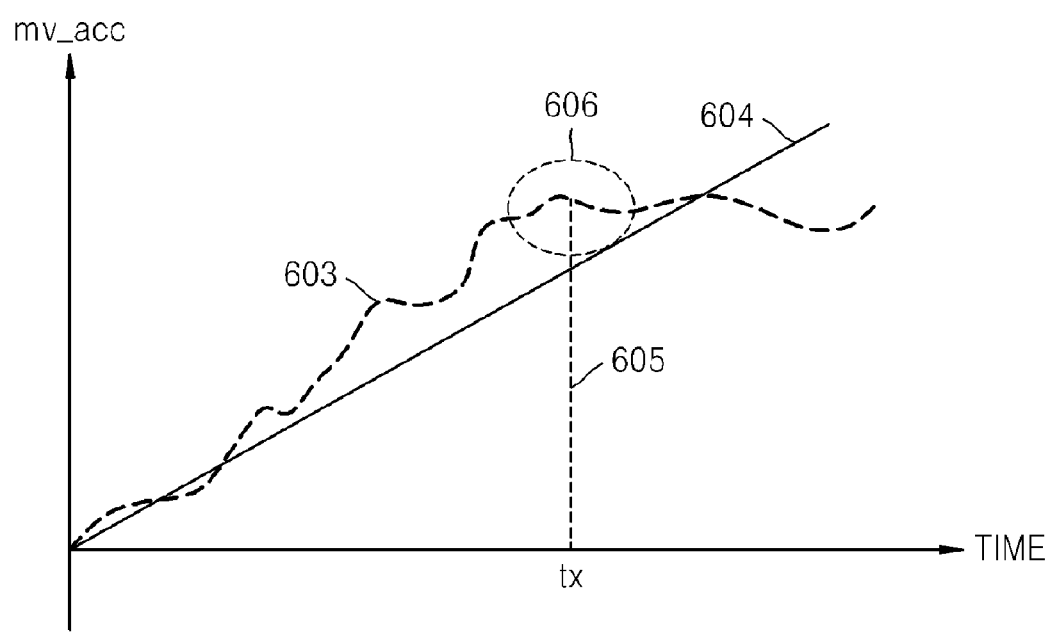
FIG. 6 is a graph illustrating a regression line matched with accumulated movement information for the case where an abnormal situation occurs.

In the case where the user's panning stops and the stop situation (section denoted by reference numeral 606) occurs as illustrated in FIG. 6, an inflection point occurs at a predetermined point of time, tx 605, and thus, an error in the movement information is not detected. Therefore, when an abnormal situation occurs and movement vectors accumulated in the buffer 320 match with the regression line model, an error is generated. Here, the inflection point means a turning point in accumulated movement data at which a panning speed or direction drastically changes.

Therefore, an abnormal situation needs to be detected in order to reset the buffer 320, and accumulate new movement information. Examples of the abnormal situation include the case where a panning operation and handshake simultaneously occur and then the panning operation stops and the handshake continues to occur during an image capturing operation performed by a user using a camera, and the case where the handshake stops and the panning operation occurs at a predetermined point during an image capturing operation performed by a user using a camera. Whether the abnormal situation occurs or not is determined by using a correlation coefficient generated in a regression model, the size of a residual, or pattern generation information of a residual.

An inflection point detector 350 extracts an inflection point using coefficient information of a regression model generated by the regression modeler 340, and generates movement correcting information for controlling a movement correction amount depending on whether the inflection point exists or not.

Also, the inflection point detector 350 outputs a movement correcting command for compensating a movement using movement information not corrected when an inflection point is detected, and simultaneously, outputs a rest signal to the buffer 320. Also, when the inflection point detector 350 does not detect an inflection point, it outputs a movement correcting command for compensating a movement using corrected movement information. At this point, the corrected movement information can be expressed by a movement correcting value as in Equation 2.

$$MV_a = GMV - PV \times R^2 \quad \text{Equation 2}$$

where GMV is an global movement vector, PV is a predicted value corresponding to the slope of a regression line, $R^2$ is a correlation coefficient between a global movement vector value and a coefficient of a regression line. Here, $R^2$ is a fitting accuracy for the case where data fitting is performed on actual data by using a regression line. When the regression line is matched with accumulated global movement vector values, $R^2$ is inversely proportional to a handshake amount. That is, since handshake reduces when the size of panning is large, $R^2$ increases. On the other hand, since handshake relatively increases when the size of panning is small, $R^2$ reduces.

Also, $R^2$ can be given by Equation 3 below.

$$R^2 = 1 - \frac{\sum ei^2}{\sum (Yi - \overline{Y})^2} = 1 - \frac{RSS}{TSS}, \quad \text{Equation 3}$$

where RSS (residual sum of squares) is the sum of residuals for the case where data fitting is performed on actual data by using a regression line, and TSS (total sum of squares) is a variation component of an entire dependent variable.

The inflection point detector 350 extracts an inflection point. Thus, the inflection point detector 350 judges the panning mode and the handshake mode using slope information β1 and correlation coefficient information $R^2$ generated by the regression modeler 340, and switches between the handshake mode and the panning mode.

Figure 7:
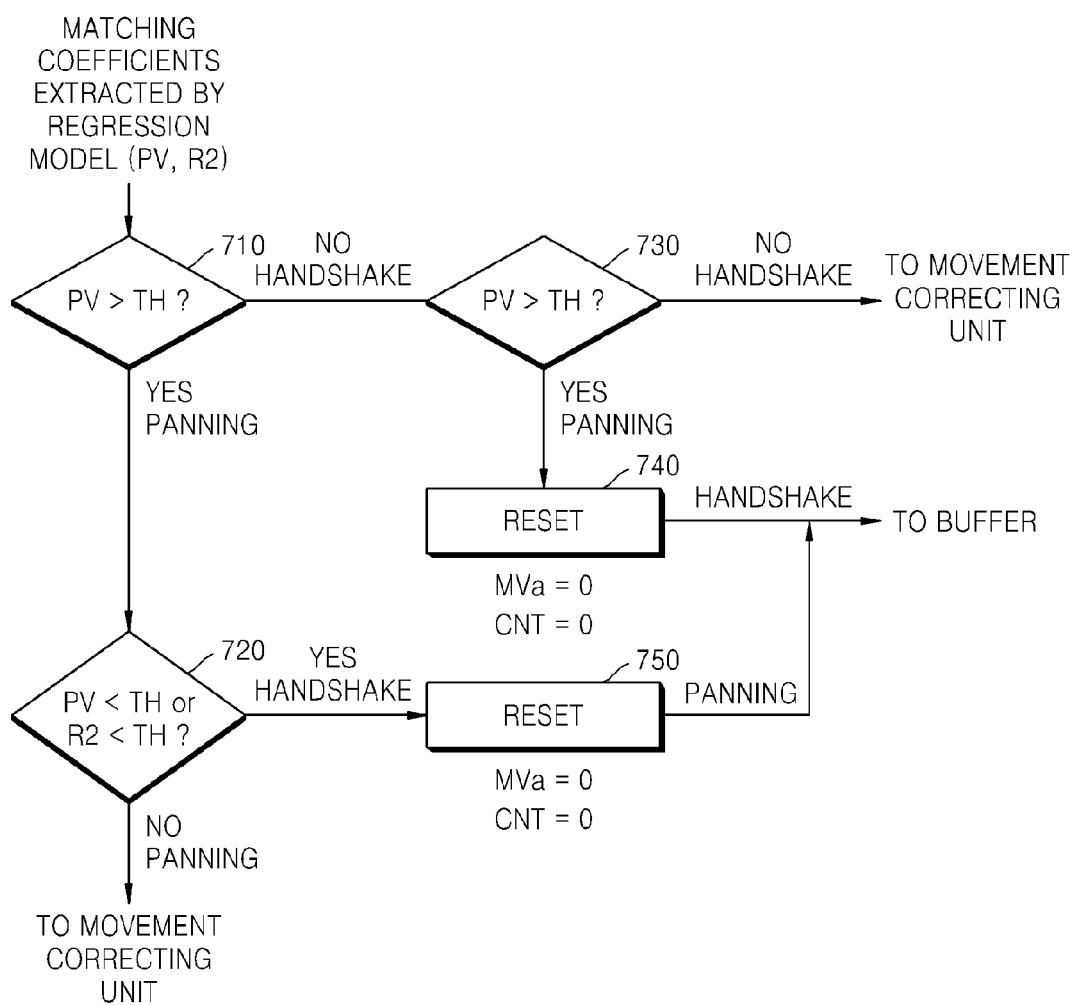
FIG. 7 is a detailed flowchart of a process at an inflection point detecting unit illustrated in FIG. 3.

FIG. 7 is a detailed flowchart of a process at the inflection point detecting unit illustrated in FIG. 3.

First, the regression modeler 340 inputs the slope information β1 and correlation coefficient information $R^2$.

At this point, a predicted value PV corresponding to the slope β1 of the regression line predicted at a predetermined point is compared with a threshold value TH (operation 710).

Here, when panning occurs, the slope of the regression line is large. When panning does not occur, the slope of the regression line is small. Therefore, when a predicted value PV corresponding to a relevant slope is greater than a threshold value TH set in advance, a situation is determined as the panning mode P, and otherwise, the situation is determined as the handshake mode H.

Subsequently, after the situation is determined as the panning mode P, a point, at which movement data that is successively input is switched from the panning mode P to the handshake mode H, is detected.

That is, in the case where the situation was the panning mode up to a previous frame but an input predicted value PV is smaller than a threshold value TH or the correlation coefficient $R^2$ is smaller than the threshold value TH, the panning mode P is switched to the handshake mode H from a corresponding point (operation 720). However, when the input predicted value PV is greater than the threshold value TH or the correlation coefficient $R^2$ is greater than the threshold value TH, the panning mode P is still maintained, and a movement correcting command for performing movement correction using corrected movement data given by Equation 2 is output.

At this point, when the situation is switched from the panning mode P to the handshake mode H, it is determined that there is no panning, and a reset operation for specific coefficients is performed. Therefore, a reset operation by performing mode switching initializes an accumulation value of movement vectors to control a current movement correcting amount (operation 750). For example, a corrected value $MV_a$ of movement data is changed to "0", and a count value CNT stored in the buffer is changed to "0".

Also, in the case where the situation was in handshake mode up to a previous frame but an input predicted value PV is greater than a threshold value TH, the handshake mode H is switched to the panning mode P from a corresponding point of time (operation 730). However, when the input predicted value PV is smaller than the threshold value TH, the handshake mode H is still maintained, and a movement correcting command for performing movement correction using corrected movement data given by Equation 2 is output.

At this point, when the situation is switched from the handshake mode H to the panning mode P, a reset operation for specific coefficients is performed. Therefore, a reset operation by performing mode switching initializes an accumulation value of movement vectors to control a current movement correcting amount (operation 750). For example, a corrected value $MV_a$ of movement data is changed to "0", and a count value CNT stored in the buffer is changed to "0".

The invention can also be embodied as computer readable codes on a computer readable recording medium or other computer readable medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. An example of other computer readable media is carrier waves (such as data transmission through the Internet). The computer readable recording medium can also be distributed over network coupled computer systems so that the computer readable code is stored and executed in a distributed fashion.

According to the present invention, a panning component can be predicted accurately and quickly, and a slight handshake that occurs during a panning operation can be detected by matching a regression line model or a regression curve model to movement information accumulated by an image capturing apparatus such as a camera or camcorder. Therefore, the present invention can effectively remove a handshake component that occurs during a camera panning situation.

While this invention has been particularly shown and described with reference to exemplary embodiments thereof, it will be understood by those of ordinary skill in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A handshake correcting method comprising:
accumulating movement information in predetermined units for a predetermined period of time;
matching a regression model to the accumulated movement information to determine a situation as being for one of a panning correction mode and a handshake correction mode;
performing switching between the handshake correction mode and the panning correction mode according to a matching factor generated by the matched regression model; and
correcting handshake based on a handshake correcting amount determined according to one of the handshake correction mode and the panning correction mode,
wherein the regression model comprises a line or curve model, which is mathematically derived using the accumulated movement information to represent an intentional panning component of a user.

2. The method of claim 1, wherein the matching factor comprises a coefficient of one of a matched regression line and a matched regression curve, and correlation between an accumulated movement vector value and the coefficient of one of the matched regression line and the matched regression curve.

3. The method of claim 1, wherein a degree of panning is determined by using a coefficient by an order of one of a matched regression line and a matched regression curve.

4. The method of claim 1, wherein the determining of the situation as being for one of the panning correction mode and the handshake correction mode comprises determining the situation as the panning correction mode when a slope of one of a regression line and a regression curve predicted by the regression model is greater than a threshold value, and determining the situation as the handshake correction mode when the slope of one of the regression line and the regression curve predicted by the regression model is smaller than the threshold value.

5. The method of claim 1, wherein the performing of switching between the handshake correction mode and the panning correction mode comprises predicting whether an abnormal situation occurs, the abnormal situation comprising a case where panning stops and only handshake occurs at a specific point of time during simultaneous occurrence of the panning and the handshake, and a case where the handshake stops and only the panning occurs at a specific point of time during simultaneous occurrence of the panning and the handshake.

6. The method of claim 5, wherein the predicting of whether the abnormal situation occurs comprises detecting the abnormal situation by using a correlation coefficient, and one of a size of a residual and consistent pattern generation information in the residual generated by the regression model.

7. The method of claim 5, wherein the accumulated movement information is stored in a buffer, and
wherein the method further comprises resetting the buffer in response to predicting that the abnormal situation occurs.

8. The method of claim 1, wherein the performing of switching between the handshake correction mode and the panning correction mode comprises switching from the panning correction mode to the handshake correction mode by using a size of a currently predicted panning component and a size of a factor related to a residual during the panning correction mode.

9. The method of claim 1, wherein the performing of switching between the handshake correction mode and the panning correction mode comprises switching from the handshake correction mode to the panning correction mode by using a size of a currently predicted panning component during the handshake correction mode.

10. The method of claim 1, wherein the performing of switching between the handshake correction mode and the panning correction mode comprises:
changing the panning correction mode to the handshake correction mode when a slope value predicted by the regression model is smaller than a threshold value, or correlation between an accumulated movement vector value and a coefficient of a regression line or curve is smaller than the threshold value during the panning correction mode; and
initializing the accumulated movement vector value to control a current corrected amount.

11. The method of claim 1, wherein the performing of switching between the handshake correction mode and the panning correction mode comprises:
changing the handshake correction mode to the panning correction mode when a slope value predicted by the regression model is greater than a threshold value during the handshake correction mode; and
initializing an accumulated movement vector value to control a current corrected amount.

12. The method of claim 1, wherein the handshake correcting amount is given by $GMV-PV \times R^2$,
where GMV is a global movement vector, PV is a slope of a regression line, $R^2$ is a correlation coefficient between an accumulated global movement vector and a coefficient of the regression line.

13. The method of claim 1, wherein the regression model is provided by the following expressions:

$$Y = \beta_0 + \beta_1 x + \varepsilon 0$$

$$\beta_1 = \frac{\Sigma(X_i - \overline{X})(Y_i - \overline{Y})}{\Sigma(X_i - \overline{X})^2}$$

wherein Y is an observed value of an actually accumulated movement vector, $\beta_0$ is an intercept, $\beta_1$ is a slope of a matched first order regression line, x is a position in time, and $\varepsilon_0$ is a residual between a matched first order regression line and the actually observed movement vector, $X_i$ and $Y_i$ are an x coordinate and a y coordinate of a straight line in a two-dimensional coordinate system, respectively, and $\overline{X}, \overline{Y}$ are average values of data on an x-axis and a y-axis, respectively.

14. A handshake correcting apparatus comprising:
- a movement predicting unit which estimates movement information in predetermined units;
- a handshake correcting information generating unit which accumulates the movement information estimated by the movement predicting unit for a predetermined period of time to match a regression model to the accumulated movement information, and extracts movement correcting information for controlling a movement correcting amount and switching between a handshake correction mode and a panning correction mode depending on whether an inflection point is detected according to coefficient information of the regression model; and
- a movement correcting unit which corrects handshake on the basis of a handshake correcting amount extracted from the handshake correcting information generating unit according to one of the handshake correction mode and the panning correction mode,
- wherein the regression model comprises a line or curve model, which is mathematically derived using the accumulated movement information to represent an intentional panning component of a user.

15. The apparatus of claim 14, wherein the handshake correcting information generating unit comprises:
- a movement accumulator which accumulates movement information that is successive in time in the predetermined units for a predetermined period of time;
- a regression modeler which matches a regression model to the accumulated movement information when the accumulated movement information accumulated by the movement accumulator is greater than a threshold value; and
- an inflection point detector which judges a situation as being for one of a panning correction mode and a handshake correction mode according to a coefficient of the regression model generated by the regression modeler, switches between the handshake correction mode and the panning correction mode on the basis of a factor of the regression model, and extracts a handshake correcting amount corresponding to a relevant correction mode.

16. The apparatus of claim 15, wherein the inflection point detector initializes the accumulated movement information when the switching between the handshake correction mode and the panning correction mode is performed.

17. A non-transitory computer readable recording medium having recorded thereon a program for executing a handshake correcting method, the method comprising:
- accumulating movement information in predetermined units for a predetermined period of time;
- matching a regression model to the accumulated movement information to determine a situation as being for one of a panning correction mode and a handshake correction mode;
- performing switching between the handshake correction mode and the panning correction mode according to a size of a matching factor generated by the matched regression model; and
- correcting handshake on the basis of a handshake correcting amount determined according to one of the handshake correction mode and the panning correction mode,
- wherein the regression model comprises a line or curve model, which is mathematically derived using the accumulated movement information to represent an intentional panning component of a user.

* * * * *